(12) United States Patent
Tajthi et al.

(10) Patent No.: US 12,403,578 B2
(45) Date of Patent: Sep. 2, 2025

(54) TOOL WITH PROTRUDING STRUCTURE

(71) Applicant: HILTI AKTIENGESELLSCHAFT, Schaan (LI)

(72) Inventors: Norbert Tajthi, Abony (HU); Bertalan Kecskés, Helvécia (HU); Zoltán Attila Papp, Kecsekmét (HU); Tamás Kotálik, Szabadszállás (HU)

(73) Assignee: HILTI AKTIENGESELLSCHAFT, Schaan (LI)

( * ) Notice: Subject to any disclaimer, the term of this patent is extended or adjusted under 35 U.S.C. 154(b) by 333 days.

(21) Appl. No.: 18/014,648

(22) PCT Filed: Jul. 7, 2021

(86) PCT No.: PCT/EP2021/068764
§ 371 (c)(1),
(2) Date: Jan. 5, 2023

(87) PCT Pub. No.: WO2022/013026
PCT Pub. Date: Jan. 20, 2022

(65) Prior Publication Data
US 2023/0356378 A1    Nov. 9, 2023

(30) Foreign Application Priority Data
Jul. 17, 2020 (EP) ................................. 20186368

(51) Int. Cl.
*B25D 17/02*    (2006.01)
*C21D 1/18*     (2006.01)
*C21D 1/42*     (2006.01)

(52) U.S. Cl.
CPC ............... *B25D 17/02* (2013.01); *C21D 1/18* (2013.01); *C21D 1/42* (2013.01)

(58) Field of Classification Search
CPC ............ B25D 17/02; C21D 1/18; C21D 1/42
See application file for complete search history.

(56) References Cited

U.S. PATENT DOCUMENTS 3,336,081 A * 8/1967 Ericsson ................ B25D 17/02
                                                          175/414
3,655,244 A    4/1972 Swisher
(Continued)

FOREIGN PATENT DOCUMENTS

DE           19757271 A1    6/1999

OTHER PUBLICATIONS

International Searching Authority, International Search Report and Written Opinion in International Application No. PCT/EP2021/068764, mailed Jul. 10, 2021.

*Primary Examiner* — Omar Flores Sanchez
(74) *Attorney, Agent, or Firm* — Leydig, Voit & Mayer, Ltd.

(57) ABSTRACT

The invention relates to a tool for a power tool, the tool having a longitudinal axis (L) and comprising a working section and a shaft with a connection end for connecting the tool to a tool holder of the power tool, wherein the shaft comprises at least one protruding structure protruding from the shaft. It is characterized in that at least within one of two halves (A, B) of the protruding structure, which are separated by a plane perpendicular to the longitudinal axis (L), the surface of the protruding structure has a finite gradient along a direction parallel to the longitudinal axis (L).

20 Claims, 1 Drawing Sheet

(56) References Cited

U.S. PATENT DOCUMENTS

| | | | | |
|---|---|---|---|---|
| 4,893,875 | A * | 1/1990 | Lonn | E21C 35/183 |
| | | | | 172/745 |
| 4,911,504 | A * | 3/1990 | Stiffler | E21C 35/183 |
| | | | | 172/745 |
| 8,038,223 | B2 * | 10/2011 | Hall | E21C 35/197 |
| | | | | 299/105 |
| 9,085,074 | B2 * | 7/2015 | Quinn | B25D 17/02 |
| 9,339,874 | B2 * | 5/2016 | Allen | B27G 15/00 |
| 2003/0026669 | A1 * | 2/2003 | Lang | B23B 51/02 |
| | | | | 175/395 |
| 2020/0078917 | A1 * | 3/2020 | Liaw | B25D 9/08 |
| 2020/0122310 | A1 * | 4/2020 | Geiger | B25D 17/02 |
| 2021/0129308 | A1 * | 5/2021 | Lee | B25D 17/08 |
| 2023/0191578 | A1 * | 6/2023 | Kochie | B25D 17/02 |
| | | | | 279/9.1 |
| 2023/0219206 | A1 * | 7/2023 | Schley | B25D 17/005 |
| | | | | 173/90 |
| 2023/0330826 | A1 * | 10/2023 | Geiger | B25D 17/02 |

* cited by examiner

TOOL WITH PROTRUDING STRUCTURE

CROSS-REFERENCE TO RELATED APPLICATIONS

This patent application is the U.S. National Stage of International Patent Application No. PCT/EP2021/068764, filed Jul. 7, 2021, which claims the benefit of European Patent Application No. 20186368.5, filed Jul. 17, 2020, which are each incorporated by reference.

The present invention relates to a tool, in particular a chisel, for a power tool, the tool having a longitudinal axis and comprising a working section and a shaft with a connection end for connecting the tool to a tool holder of the power tool, wherein the shaft comprises at least one protruding structure protruding from the shaft.

Demolition works, for example breaking building elements made of concrete or the like, often place high demands on the tools, e. g. chisels, employed.

Therefore, it is an object of the present invention to provide a tool according to the preamble of claim 1 having high robustness and great durability and a method for producing such a tool.

This is achieved in a number of aspects of the present invention, in which a first aspect is a tool, in particular a chisel, for a power tool, the tool having a longitudinal axis and comprising a working section and a shaft with a connection end for connecting the tool to a tool holder of the power tool, wherein the shaft comprises at least one protruding structure protruding from the shaft, wherein at least within a first of two halves of the protruding structure, which are separated from each other by a plane perpendicular to the longitudinal axis, the surface of the protruding structure has a finite gradient along a direction parallel to the longitudinal axis.

Hence, at least within the first half of the protruding structure neither the protruding structure as a whole nor a part of it project from the shaft at a perpendicular angle.

In particular, the surface of the protruding structure may be formed such that there exists at least one angle in relation to the longitudinal axis, along which the surface of the protruding structure does not even partly shade itself.

Thus, a basic idea behind the invention is that the protruding structure is formed such that its whole surface is accessible along at least one direction, the direction being non-perpendicular to the longitudinal axis. This allows to treat different sections of the tool differentially. For example, the tool may be hardened to different hardnesses depending on the respective section of the tool. Due to the specific surface of the protruding structure, the protruding structure does not stand in its own way during the treatment. Hence, the protruding structure and its surroundings as well as the rest of the tool may be treated in a well-controlled fashion.

As a result, powerful treatments, for example efficient hardening methods, become applicable even to tools with such a protruding structure, providing robust tools with outstanding durability.

The tool may be a chisel, in particular a pointed chisel or a flat chisel.

The protruding structure may be part of the connection end. Preferably, at least the shaft and the protruding structure may be formed as one single body. For example, the protruding structure may be welded onto and around the shaft.

In a preferred embodiment of the invention the protruding structure may be a ring structure. It may thus form a connection end of a tool for high power tools.

The protruding structure may be asymmetrical to a center plane of the protruding structure, the center plane being perpendicular to the longitudinal axis.

The protruding structure and in particular its surface may have two sides, one side facing towards the working section and the other side facing into the counter-direction, i. e. towards a free end of the connection end. At least one of the sides may have a S-shaped or at least a basically S-shaped form.

A further aspect of the invention is that the tool may be hardened by inductive hardening. By way of inductive hardening, an applied heating power and a feed rate of the tool may be changed along the entire length of the tool, thus providing a simple way of treating the tool differentially in different sections. For example, in some sections the tool may be through-hardened and in some sections the tool may be shell-hardened.

If the tool is, for example, a chisel, during chiseling, each section of the tool, i. e. the chisel, is subjected to different stresses. The different stresses require different microstructures or hardness profiles of the material of the tool in each of its sections. Hence, in a preferred embodiment of the invention the tool may contain at least two sections of different microstructure.

Yet such a differentiation cannot or at least cannot easily be achieved by conventional heat treatments like furnace-based hardening treatments, whereas by induction hardening, heating power and feed rate can be changed along the entire length of the tool during hardening. Each of the sections may be adapted to the specific demands it is to face, e. g. during demolition works or the like.

Particularly, the working section may be through-hardened. The working section of the chisel is usually subjected to abrasive stress during e. g. demolition works. Due to wear, the cross-section of the tool decreases continuously, so a through-hardened structure is required in order to prevent the chisel from getting blunt.

Furthermore, at least a part of the shaft may be shell-hardened. In particular, the connection end or at least a part of the connection end may be shell-hardened. In order to protect its outer surface against external damage, the surface may be hardened to achieve a hard, wear-resistant layer. The thickness of the layer may be between 0.5 and 5 mm, preferably 2 mm. The central core of the connection end or at least of the part of the connection end may remain non-hardened and soft. The combination of the hardened surface and the soft core may provide a high toughness against bending and may, nevertheless, retain a sufficient abrasion resistance.

Preferably, in particular in case the tool is a chisel or the like, an end-section of the connection end may be through-hardened in order to withstand, for example, strikes of a chiseling machine the tool is used with.

A further aspect of the invention is that the connection end may have six grooves, which may preferentially be distributed evenly around the connection end. Furthermore, at least the shaft may have a hexagonal or at least basically hexagonal cross-section. These measures permit a safe mounting in a tool holder of the power tool and thus may further increase the durability of the tool.

Another aspect of the invention is a method for producing a tool according to the invention one of the preceding claims, wherein the method comprises a first step of inductively heating the tool.

The method may comprise a second step of cooling the tool by spraying a coolant along a direction along which the surface of the protruding structure of the tool does not even partly shade itself. This is possible due to the specific shape of the protruding structure. Thus, it is possible to heat one section of the tool and to cool another section of the tool at the same time.

The invention will be described further, by way of example, with reference to the accompanying drawings which illustrate preferred embodiments thereof, it being understood that the following description is illustrative and not limitative of the scope of the invention. The features shown there are not necessarily to be understood to scale and are presented in such a way that the special features of the invention are clearly visible. The various features may be realized individually or in combination in any desired way in variants of the invention.

In the drawings:

FIG. 1 schematically shows a side view of a tool;

Same reference signs are used for functionally equivalent elements in all figures.

Figure 1:
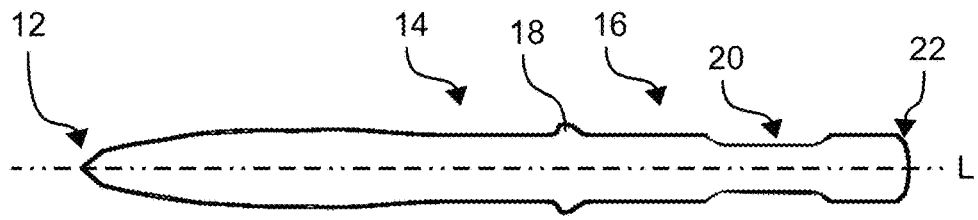

FIG. 1 schematically shows a side view of a tool 10 with a working section 12, a shaft 14, the shaft comprising a connection end 16 with a protruding structure 18 and grooves 20. The tool 10 has a longitudinal axis L. The shaft 14 and thus the connection end 16 may have hexagonal cross-sections. Their diameters may be more than 20 mm, in particular it may be between 25 and 35 mm, preferably 28 mm.

The working section 12 and a striking end 22, located at a free end of the connection end 16, are through-hardened. The rest of the tool 10 is soft-hardened. Thus, the tool 10 contains several sections of different microstructure.

Figure 2:
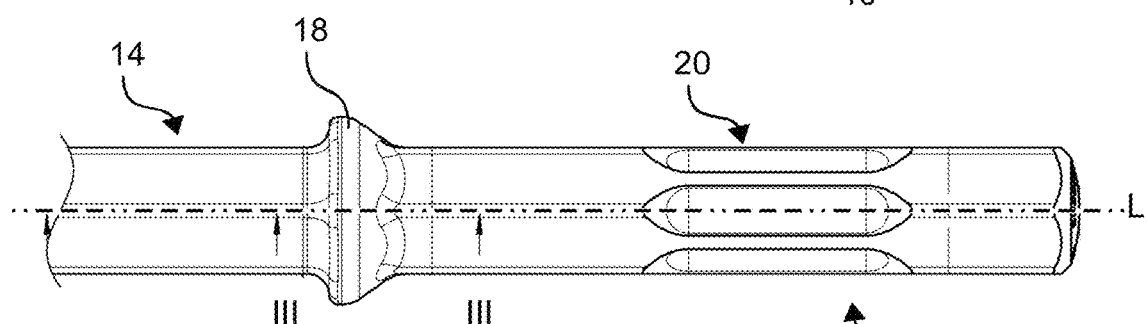
FIG. 2 shows a side view of a connection end of the tool.

FIG. 2 shows an enlarged side view of the connection end 16. The connection end 16 comprises six grooves 20. The grooves 20 are evenly and circumferentially distributed around the connection end 16.

The protruding structure 18 has a ring structure. It surrounds the rest of the shaft 14 and thus protrudes radially from the rest of the shaft 14.

Figure 3:
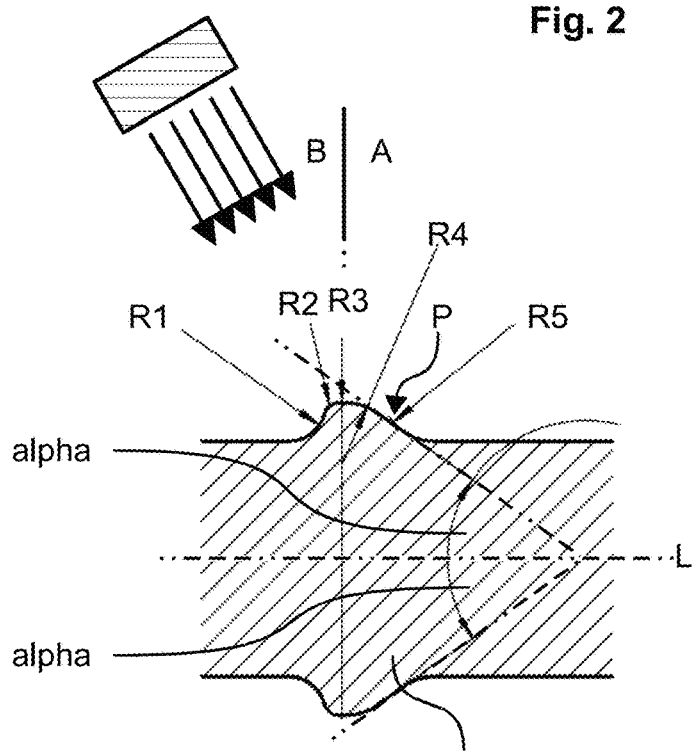
FIG. 3 shows a longitudinal sectional view of a section of the connection end comprising a protruding structure.

FIG. 3 shows a longitudinal cross-section according to the reference signs III of FIG. 2 and cut along a central plane comprising the longitudinal axis L. The surface of the protruding structure 18 comprises several sections with different radii of curvature R1, R2, R3, R4, and R5. The radii may, for example, be between 5 and 7 mm. The largest diameter of the protruding structure 18 may be between 40 and 45 mm, preferably 42.5 mm.

The protruding structure 18 has a first half A and a second half B both being separated from each other by a plane perpendicular to the longitudinal axis L.

At least within the first half A the surface of the protruding structure 18 has a finite gradient along a direction parallel to longitudinal axis L. As an example, FIG. 3 shows an angle alpha between a tangent through a point P of the surface of the protruding structure 18 and the longitudinal axis L within the plane of the cross-section shown in FIG. 3 and thus along a direction parallel to the longitudinal axis L. The angle alpha is an acute angle and thus less than 90° in relation to the longitudinal axis L. The same applies for all other points along the surface within the first half A of the protruding section 18.

The surface within the first half A and according to the cross-section shown in FIG. 3 is basically S-shaped.

By means of a ring-shaped spraying apparatus 24 it is thus possible to spray a coolant along a spraying direction S onto the surface of the tool 10 (FIG. 1) and in particular onto the surface of the protruding structure 18. The spraying direction S is steeper relative to the longitudinal axis L than the steepest tangent of the surface within the first half A. Hence, the surface of the protruding structure 18 does not even partly shade itself along the spraying direction S.

Hence, by moving the spraying apparatus 24 in a direction parallel to the longitudinal axis L and from left to right according to FIG. 3, the whole surface of the tool 10 and in particular of the protruding structure 18 can be wetted by the coolant and thus be cooled in a well-controlled manner.

Figure 4:
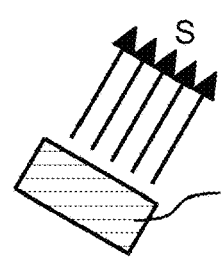
FIG. 4 shows a flow chart of a method for producing a tool.
Figure 4:
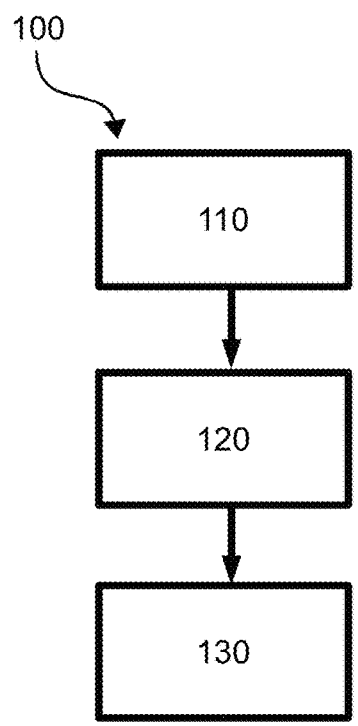

FIG. 4 shows a flow chart of a method 100 for producing a tool 10, for example the tool 10 according to the embodiment as described in relation to FIGS. 1 to 3.

In a first step 110 the tool 10 is formed from a raw material. For example, the protruding structure 18 may be welded onto a, basically rod-shaped, raw form of the shaft 14.

In the following steps, the tool 10 is hardened:

In a second step 120 the tool 10 is inductively heated section by section along its longitudinal axis L by an inductive heating apparatus.

In a third step 130, which preferably may take place in parallel to the second step 120, at least one of the already heated sections is cooled by spraying a coolant along the direction S onto the surface of the section.

For this, the spraying apparatus 24 may preferably be used. The spraying apparatus 24 may be moved from one end of the tool 10, in particular the left end according to FIG. 3, to its other end, thus for example its right end.

The feed rate, the heating power and duration, the intensity of spraying and thus the cooling power, etc. may be changed from section to section. Thus, the tool 10 may be specifically hardened in each of the sections.

The invention claimed is:

1. A tool for a power tool, the tool having a longitudinal axis (L) and comprising a working section and a shaft with a connection end for connecting the tool to a tool holder of the power tool, wherein the shaft comprises at least one protruding structure protruding from the shaft the shaft having a surface and two halves (A, B) wherein at least within one of two halves (A, B) of the protruding structure which are separated from each other by a plane perpendicular to the longitudinal axis (L), the surface of the protruding structure has a finite gradient along a direction parallel to the longitudinal axis (L), and within the half A the surface of the protruding structure comprises several sections with different radii of curvature, wherein an angle (alpha) between a tangent through a point (P) of the surface of the protruding structure and the longitudinal axis (L) is an acute angle less than 90° in relation to the longitudinal axis (L).

2. The tool according to claim 1, wherein the protruding structure is a ring structure.

3. The tool according to claim 1, wherein the protruding structure is asymmetrical to a center plane of the protruding structure, the center plane being perpendicular to the longitudinal axis (L).

4. The tool according to claim 1, wherein the tool is hardened by inductive hardening.

5. The tool according to claim 1, wherein the tool contains at least two sections of different microstructure.

6. The tool according to claim 1, wherein the working section is through-hardened.

7. The tool according to claim 1, wherein at least a part of the shaft is shell-hardened.

8. The tool according to claim 1, wherein an end-section of the connection end is through-hardened.

9. The tool according to claim 1, wherein the connection end has six circumferentially evenly distributed grooves.

10. A method for producing a tool according to claim 1, the tool having a longitudinal axis (L) and comprising a working section and a shaft with a connection end for connecting the tool to a tool holder of the power tool, wherein the shaft comprises at least one protruding structure protruding from the shaft the shaft having a surface and two halves (A, B) wherein at least within one of two halves (A, B) of the protruding structure which are separated from each other by a plane perpendicular to the longitudinal axis (L), the surface of the protruding structure has a finite gradient along a direction parallel to the longitudinal axis (L), and within the half A the surface of the protruding structure comprises several sections with different radii of curvature, wherein an angle (alpha) between a tangent through a point (P) of the surface of the protruding structure and the longitudinal axis (L) is an acute angle less than 90° in relation to the longitudinal axis (L), the method comprising a first step of inductively heating the tool.

11. The method according to claim 10, comprising a second step of cooling the tool by spraying a coolant along a direction(S) along which the surface of the protruding structure of the tool does not even partly shade itself.

12. The tool according claim 2, wherein the protruding structure is asymmetrical to a center plane of the protruding structure, the center plane being perpendicular to the longitudinal axis (L).

13. The tool according to claim 2, wherein the tool is hardened by inductive hardening.

14. The tool according to claim 3, wherein the tool is hardened by inductive hardening.

15. The tool according to claim 2, wherein the tool contains at least two sections of different microstructure.

16. The tool according to claim 3, wherein the tool contains at least two sections of different microstructure.

17. The tool according to claim 4, wherein the tool contains at least two sections of different microstructure.

18. The tool according to claim 2, wherein the working section is through-hardened.

19. The tool according to claim 3, wherein the working section is through-hardened.

20. The tool of claim 1, comprising a chisel.

* * * * *